US008095554B1

(12) United States Patent
Lew et al.

(10) Patent No.: US 8,095,554 B1
(45) Date of Patent: *Jan. 10, 2012

(54) GLOBAL INVENTORY WAREHOUSE

(75) Inventors: Melvin Lew, Jersey City, NJ (US); Syed Husain, Jersey City, NJ (US); Perry Fotinatos, Jersey City, NJ (US)

(73) Assignee: Goldman Sachs & Co., New York, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 12/571,217

(22) Filed: Sep. 30, 2009

Related U.S. Application Data

(63) Continuation of application No. 11/680,464, filed on Feb. 28, 2007, now Pat. No. 7,617,210.

(51) Int. Cl.
*G06F 17/30* (2006.01)
(52) U.S. Cl. ...................................................... 707/769
(58) Field of Classification Search .................. 707/609, 707/705, 752, 769, 791, 802, 955
See application file for complete search history.

(56) References Cited

U.S. PATENT DOCUMENTS

| 2003/0014332 A1* | 1/2003 | Gramling | 705/28 |
| 2008/0092112 A1* | 4/2008 | Jin et al. | 717/106 |
| 2008/0162584 A1* | 7/2008 | Papili et al. | 707/200 |

FOREIGN PATENT DOCUMENTS

| WO | WO 2008/081333 A2 | 7/2008 |
| WO | WO2008/081333 A2 * | 7/2008 |

OTHER PUBLICATIONS

ASG, Maximizing Your IT Assets, 2004, Allen System Group, pp. 1-2.*

* cited by examiner

*Primary Examiner* — Fred I Ehichioya
(74) *Attorney, Agent, or Firm* — Chadbourne and Parke LLP; John A. Squires

(57) ABSTRACT

Building and maintaining an accurate and up-to-date global inventory of hardware, software, and telecommunications assets deployed throughout an organization is described. A global inventor warehouse (GIW) receives an identification and physical location of these assets from multiple source systems. Some of these source systems contain information pertaining to the assets that has been manually entered into the source system by a human administrator. Other source systems, meanwhile, contain information that has been automatically collected by the source systems without human intervention. The GIW receives this information from the source systems and stores it within a GIW database. The GIW database may thus contain a global inventory of all or nearly all of the hardware, software, and telecommunications assets distributed throughout the organization. This database may also contain an identification of physical locations within the organization of all or substantially all of these assets.

27 Claims, 14 Drawing Sheets

800

Register Application

⬅ ➡ ✖ 🔄 🏠 🔍 Search ⭐ Favorites

Address http://www.corp.com/appdir

| Intranet Home Page | Application Directory |

App Directory Home Page
Register Application
Modify
Portfolio Reports
　By Tier
　By Location
　By Division
　By Category
　By Status Application Directory　　　　　　　　Welcome Jones, Mary Register Application: Deployment Data (step 2 of 5) ← 802

Physical Location　[New York]　— 804
Deployment Name　[App Dir – New York]　— 806
AID　　　　　5000　— 808
Tier　　　　　[4 ▼]　— 810
Next Tech Test Date　[　▼]　— 812
Deployment Manager　[Jones, Mary] [Select]　— 814
LifeLine ROTAs　[　　　] [Add ROTA] [Remove ROTA]
　　　　　　816
Servers　818 — [Add Server] [Remove Server]

4 items found, displaying all items

| ASSET TAG | HOSTNAME | LOCATION | MAKE/MODEL | PLATFORM (OS) |
|---|---|---|---|---|
| 296340 | host1.org.com | New York | ProLiant DL580 | Linux AS |
| 296356 | host2.org.com | San Fran | ProLiant DL580 | Linux AS |

Register Application

Address: http://www.corp.com/appdir

| Intranet Home Page | Application Directory |

App Directory Home Page
Register Application
Modify
Portfolio Reports
  By Tier
  By Location
  By Division
  By Category
  By Status Application Directory  Welcome Jones, Mary Register Application: BCP Audit Data (step 5 of 5) — 1102

Technology Tested [Date ▼] — 1104
User Tested [Date ▼] — 1106
Connectivity Tested [Date ▼] — 1108

BCP Comments: Tier is unknown at this time — 1110

722

[Back] [Approve] [Reject]
      1112    1114

Fig. 11

GLOBAL INVENTORY WAREHOUSE

STATEMENT OF RELATED APPLICATIONS

This application is a continuation of, and claims priority to, pending U.S. patent application Ser. No. 11/680,464, entitled "GLOBAL INVENTORY WAREHOUSE", filed on Feb. 28, 2007, which is incorporated herein in its entirety by reference.

TECHNICAL FIELD

This disclosure relates to building, maintaining, and managing an inventory of hardware, software, and telecommunications assets distributed throughout an organization.

BACKGROUND

In the wake of recent disasters—both natural and manmade—business continuity planning has become increasingly important to many organizations. Disasters such as floods, hurricanes, tsunamis, tornadoes, terrorist attacks, prolonged power outages, and the like can cause significant disruptions to an organization. Business continuity planning (or BCP) is a methodology used to create a plan for how an organization will resume partially or completely interrupted critical function(s) within a predetermined time after a disaster or disruption. BCP was used in many industries to anticipate and handle potential computing problems introduced by crossing into the new millennium in 2000, a situation generally known as the Y2k problem. Regulatory agencies subsequently required certain important industries—power, telecommunication, health, and financial—to formalize BCP manuals to protect the public. Those new regulations are often based on the formalized standards defined under ISO/IEC 17799 or BS 7799.

Although business focus on BCP arguably waned somewhat following the Y2K transition (mainly due to its success), the lack of interest unequivocally ended on Sep. 11, 2001, when simultaneous terrorist attacks devastated lower New York City. Many critical functions for many different organizations were lost and not restored for sometime. This tragic event changed the worst case scenario paradigm for business continuity planning.

Today, BCP may be a part of a larger organizational effort to reduce operational risk associated with poor information security controls, and thus has a number of overlaps with the practice of risk management. However, the scope of BCP extends beyond information security only. Part of good business continuity planning includes an accurate accounting of computing assets and resources that an organization possesses. Many organizations track their hardware assets by manually placing bar code labels on computers, monitors, etc. and then scanning those labels to create an electronic record of the assets. Unfortunately, over time, this data becomes stale as computers and monitors are moved or replaced, and applications are updated, deleted, or changed out. Moreover, the process of collecting the information initially is manually intensive and prone to inaccuracies.

Accordingly, there remains a need for improved techniques in building and maintaining a current and accurate inventory of computing resources within an organization.

SUMMARY

Building and maintaining an accurate and up-to-date global inventory of hardware, software, and telecommunications assets deployed throughout an organization is described. In one aspect, a global inventory warehouse receives an identification and physical location of these assets from multiple source systems. Some of these source systems contain information pertaining to the assets that has been manually entered into the source system by a human administrator. Other source systems, meanwhile, contain information pertaining to the assets that has been automatically collected by the source systems without human intervention. The global inventory warehouse receives this information from the source systems and stores it within a global inventory warehouse database. The global inventory warehouse database may thus contain a global inventory of all or nearly all of the hardware, software, and telecommunications assets distributed throughout the organization. This database may also contain an identification of physical locations within the organization of all or substantially all of these assets.

In another aspect, the global inventory warehouse facilitates management of the global inventory. A user can query, for example, the global inventory stored within the global inventory warehouse database to identify certain assets that satisfy the search criteria. As one example, the user may submit a request to identify what hardware, software, or telecommunications assets currently reside in a particular physical location of the organization. This type of knowledge allows the organization to respond quickly in the event of disaster or disruption and restore the functionality of any affected assets.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

FIG. 1 illustrates an exemplary environment in which an architecture for building, maintaining, and managing an inventory of hardware, software, and telecommunications assets distributed throughout an organization may be implemented.

FIGS. 2-3 show renderings of an exemplary user interface to manage a portfolio of applications in an inventory of applications and related assets. In FIG. 2, the UI facilitates entry of search criteria for applications distributed throughout the organization. In FIG. 3, the UI presents a listing of applications satisfying the submitted search criteria.

FIGS. 7-11 show a series of renderings of example interfaces to facilitate an automated and systematic registration process for registering applications being deployed in the organization.

DETAILED DESCRIPTION

This disclosure is directed to techniques for constructing, maintaining, and managing an inventory of hardware, software, and telecommunications assets distributed throughout an organization. The inventory may also identify applications, which are logical sets of resources including computing devices, software programs, and/or telecommunications devices that perform a specific business function. The techniques include a streamlined process for developers and managers to register applications through use of automated discovery processes for servers and locations. Also, various forms of inventory management and reporting of applications and deployments are supported. Data integrity is ensured and managed through a reconciliation process.

As a result, the inventory is kept accurate and up to date. This provides a robust information source for many different planning purposes. For instance, with such an inventory, authorized personnel can ascertain at any given time what assets are available where. In an event that a disruption impacts performance at a specific location (e.g., natural disaster, terrorist attack, etc.), members of the business continuity planning (BCP) team can quickly determine what assets are impacted and rebuild that capability at another location.

For discussion purposes, the techniques will be described in the context of an exemplary environment shown in FIG. 1. However, the techniques may be used in other environments, and be implemented using different architectures than those shown in the exemplary environment discussed below.

Exemplary Environment

Figure 1:
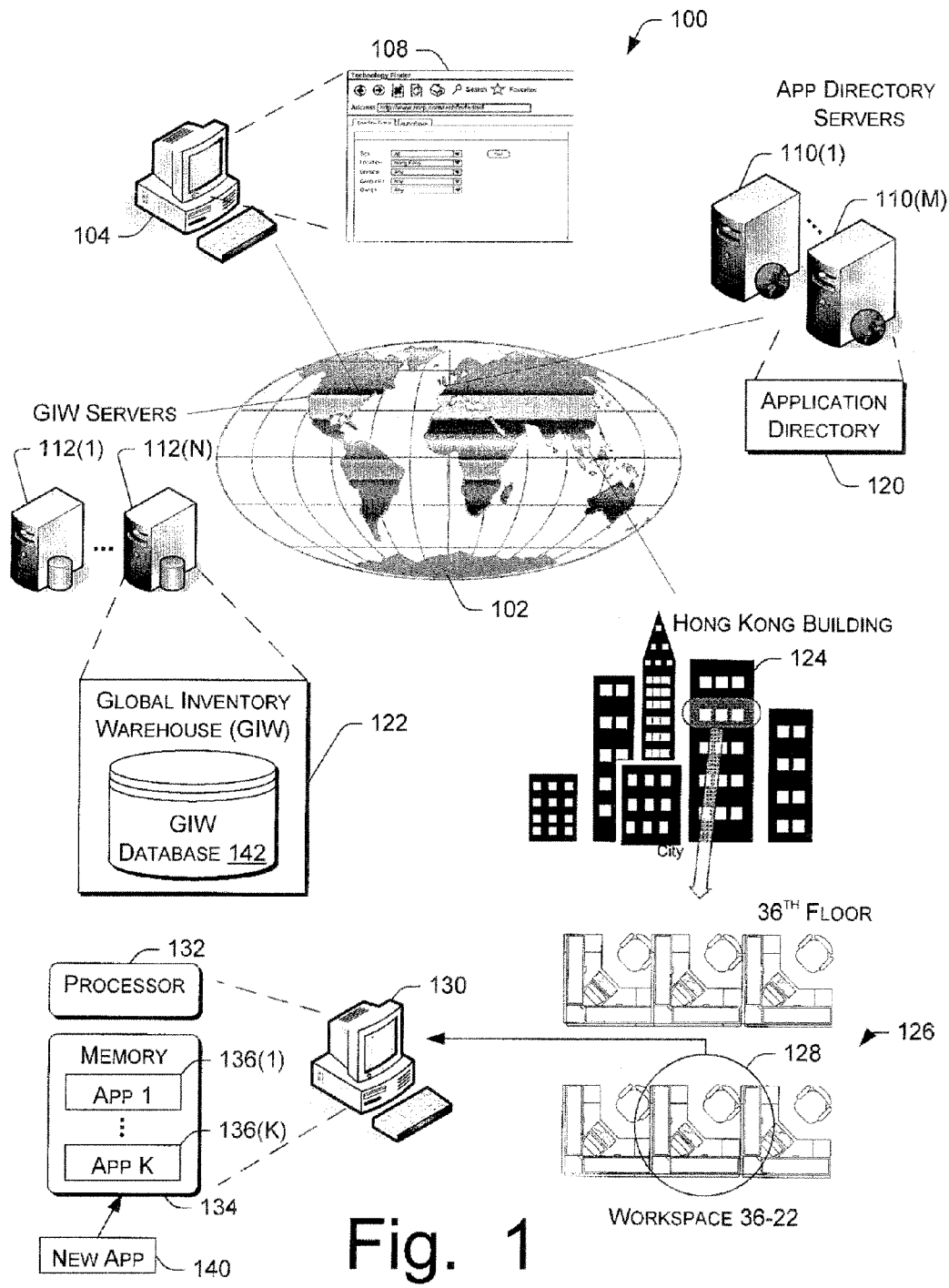

FIG. 1 illustrates an exemplary environment 100 in which an architecture for building, maintaining, and managing an inventory of hardware, software, and telecommunications assets distributed throughout an organization may be implemented. In the illustrated environment 100, the organization is a global organization with resources spread worldwide, as represented by various locations around a globe 102. The architecture enables the global organization to have knowledge of these distributed assets in the event portions of the organization experience unexpected events, such as natural disasters or human acts of terrorism, theft, arson, and so forth. Software assets include applications, each of which is a logical set of resources that perform a specific business function. The resources may include computing devices, software programs, telecommunications devices, and/or any other assets or processes that together perform the business function.

By maintaining a current inventory of hardware, software, and telecommunications assets, the architecture allows authorized personnel to find answers to many interesting and diverse questions. Of particular interest is the question of what technology is currently implemented at certain physical locations of the organization, and if something were to happen to that location, what is needed to rebuild its functionality.

To illustrate the usefulness of such an architecture, consider the environment 100 of FIG. 1 where a member of a business continuity planning (BCP) group resides in New York City. The BCP member uses a computing device 104 (e.g., a desktop PC, laptop, PDA, cell phone, etc.) to find out what hardware resources, software applications, or telecommunications devices exist at a facility in Hong Kong. The computing device 104 executes a browser or other program 108 to access remote servers over a network (not shown) to access the inventory of hardware, software, and telecommunications assets and ascertain which are located in the facility in Hong Kong. Although not shown, the network might be any number or combination of different networks, including proprietary data networks, the Internet, wireless networks, satellite networks, and the like.

Among the remote servers are one or more application directory servers 110(1), . . . , 110(M) that may reside, for example, in a different location (e.g., London) and one or more global inventory warehouse (GIW) servers 112(1), . . . , 112(N) that may reside in still another location (e.g., San Francisco). It is noted that these locations are merely illustrative, as the servers may be co-located at the same location or located in any number of places throughout the world. Furthermore, these servers may be implemented in any number of ways, including as networked servers (perhaps arranged as a server farm), a mainframe computer, or other types of computerized systems.

An application directory program 120 is installed and executed on the servers 110(1)-(M). The application directory 120 maintains an inventory of applications deployed through the organization. The application directory 120 also provides a streamlined process for developers and managers to register applications through use of automated discovery processes that systematically gather various types of data about the applications, such as servers, locations, deployment details, and so on. The application directory 120 is described below in more detail with reference to FIGS. 5-12.

A global inventory warehouse GIW) 122 includes a GIW database 142 and is serviced by the GIW servers 112(1)-(N). The GIW 122 serves as a repository of data feeds from reconciliation and authoritative sources for the purposes of building a consolidated inventory of the organization's hardware, software, and telecommunications assets. The GIW 122 receives data from many different sources and maintains a history of the data. Further, the GIW 122 supports reporting of the information in many different views and formats. It is further noted that although the GIW 122 is shown as residing in one location (e.g., San Francisco), the GIW 122 may be distributed over multiple geographic locations and/or replicated in multiple different places to protect against single site failures.

Figure 13:
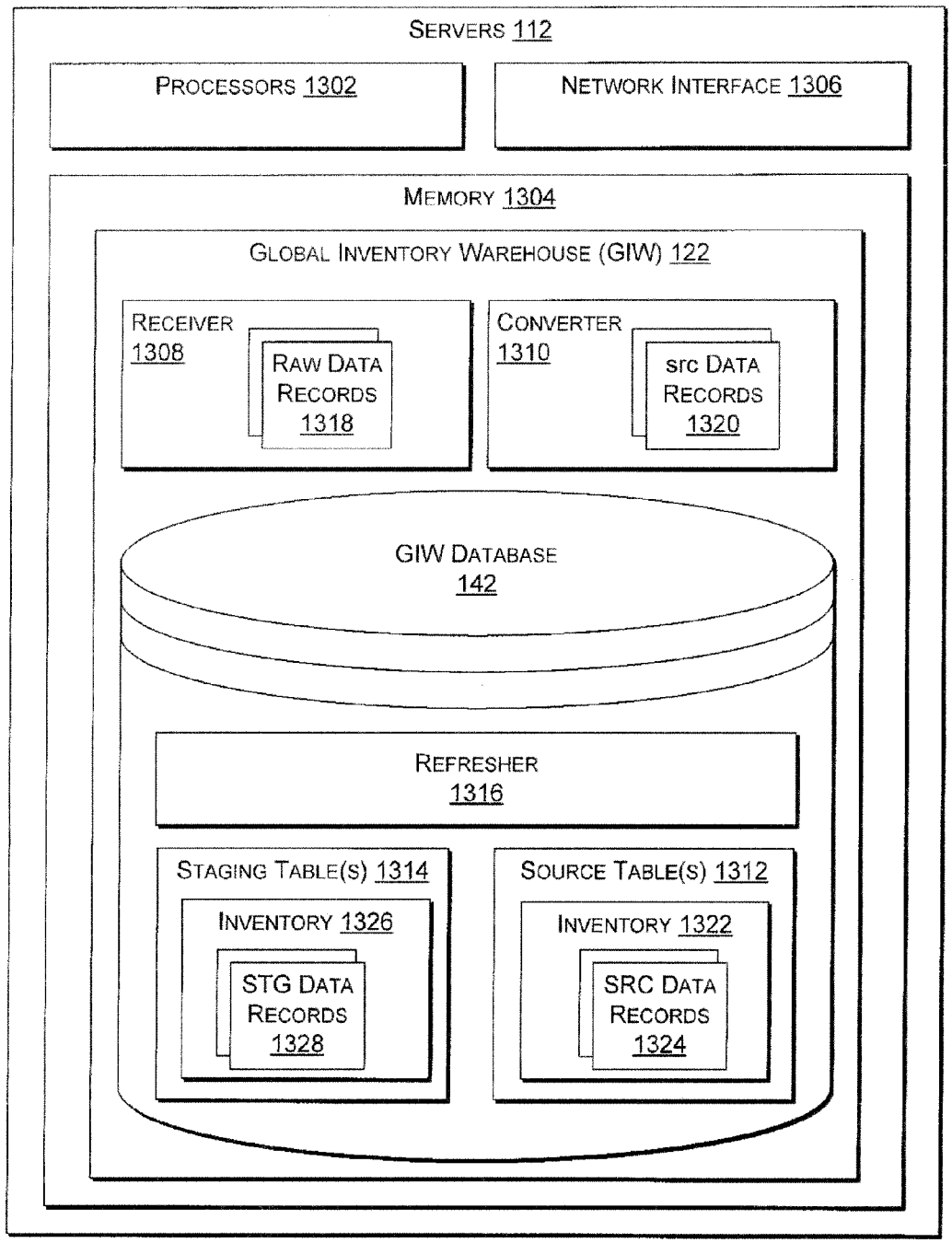
FIG. 13 is a functional block diagram of a global inventory warehouse (GIW) implemented on a computing system.
Figure 14:
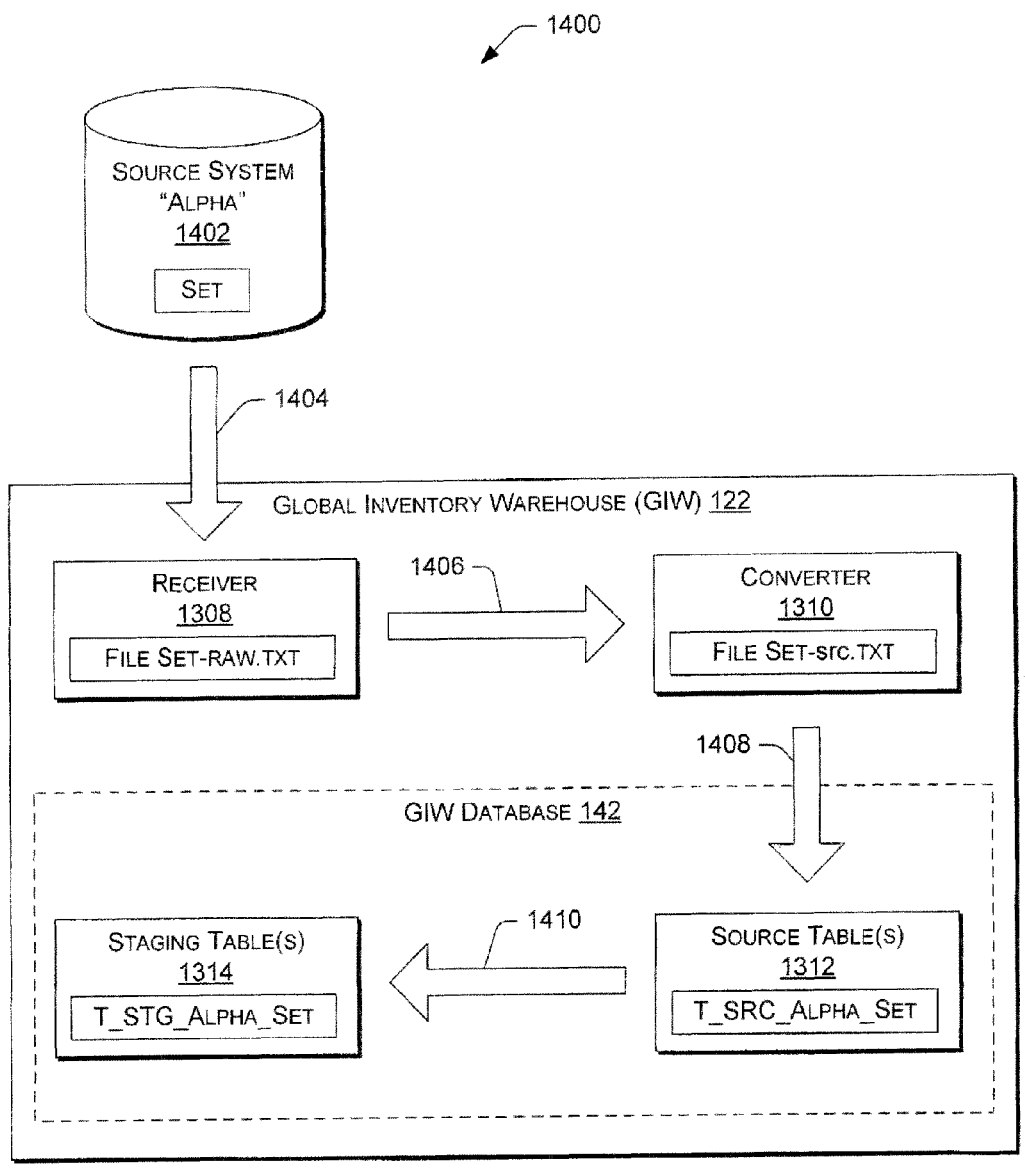
FIG. 14 illustrates an exemplary process for receiving a batch of data records from a source system and storing the batch in a GIW database.

The application directory 120 is one of the data sources for the GIW 122. When a developer registers a new application using the application directory 120, that information is first stored in an inventory database maintained by the application directory 120 and then fed to the GIW 122 for storage and organization. Authorized users (e.g., BCP members, developers, managers, etc.) can access the information in application directory 120 and GIW 122 anytime using a Web-based tool, such as the browser 108. FIGS. 13-14 and their corresponding text describe the GIW 122 in more detail.

Continuing with our earlier scenario, suppose a user in the organization's New York office wants to know what technology is on the 36$^{th}$ floor of a building in Hong Kong. In FIG. 1, the organization's facility in Hong Kong is represented by a building 124. A portion of the 36$^{th}$ floor is shown as a collection of cubicle workspaces 126. Using computing device 104, the user can sub a request via a browser 108 for a listing of all technology housed on the 36$^{th}$ floor of building 124 in Hong Kong.

Figure 2:
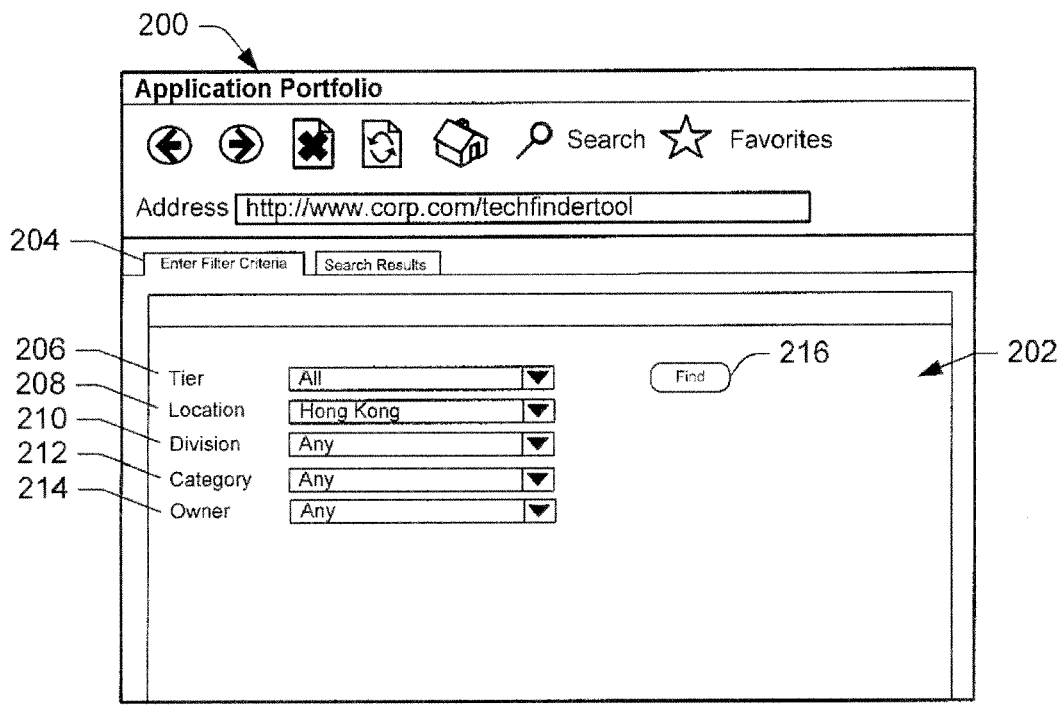

FIG. 2 shows an exemplary user interface (UI) 200 rendered on the browser 108 to facilitate a search of applications in the application inventory. In this example, the user may enter different search criteria into a search pane 202 selected by an "enter filter criteria" tab 204. The search criteria may be predefined or responsive to keyword strings entered by the user. In FIG. 2, the search pane 202 provides multiple predefined search criteria, with some predetermined values made available in pull down menus. Among the search criteria are a tier 206 that defines the criticality of the application, a location 208 at which the technology is deployed, a division 210 that uses the technology, a category 212 to which the application belongs, and an owner 214 who is responsible for the business area, development, or operations related to an application. In this particular example, the user in interested in technology in Hong Kong, so she selects Hong Kong for the location search criterion 208. Once the user selects the appropriate criteria, she may click or otherwise actuate the "Find" button 216 to submit a search query to the application directory 120 (or GIW 122).

In some implementations, the UI may facilitate entry of additional information to provide varying levels of granularity in the search. For instance, in response the user entering the location "Hong Kong", the UI might return another pane seeking further selection criteria, such as a listing of possible buildings in Hong Kong, the floors in those buildings leased by the organizations, and even workspaces on the floors. It is further noted that other UI techniques may be employed to facilitate entry of criteria for the search request. For instance, the UI might allow the use to enter keyword phrases of one or more keywords (e.g., "Hong Kong computer software), or type in queries in the form of questions (e.g., "What software is installed on the computers in Hong Kong?").

With reference again to FIG. 1, the application directory servers 110(1)-110(M) receive the request from the computing device 104 and search the directory 120 for the requested information. Once found, the servers 110 format and serve the data to the user's computing device 104 in the form of a webpage report arranged, for example, in terms of hard resources (e.g., computers, keyboards, monitors, computers, network connections, etc.) and soft resources (e.g., applications, drivers, etc.). Of course, the GIW servers 112(1)-(N) may also receive this request and search the GIW 122 for the requested information.

By submitting different search requests, the user may either expand or narrow the search. For instance, the user may ask for a more expansive report of all technology in whole building 124 in Hong Kong. Conversely, the user may drill down farther and ask for information pertaining to a specific cubicle or workspace 128, such as workspace 36-22 (i.e., the $22^{nd}$ workspace on the $36^{th}$ floor) shown in FIG. 1. Continuing this latter example, suppose the target workspace includes a desktop computer 130 having a processor 132, a memory 134, and application programs 136(1) . . . . , 136(K) stored in the memory. Thus, a report returned to the requesting user computing device 104 in response to a request for technology residing in workspace 36-22 might include a listing of the computer 130 (e.g., box, monitor, keyboard, mouse, etc.), processor 132, memory 134, and application programs 136(1), . . . , 136(K). These results may be presented in any configurable format.

Figure 3:
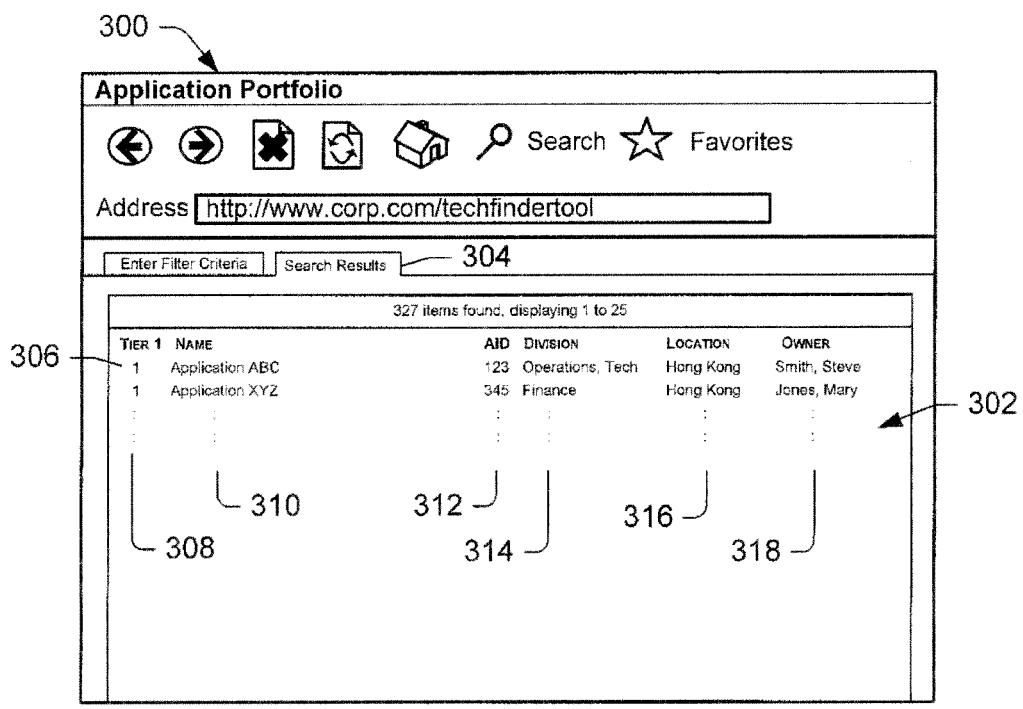

FIG. 3 shows a rendering of an exemplary UI 300 with a listing of applications returned from the submitted search criteria. A results pane 302 selected by a "search results" tab 304 shows the various applications located in the search. In this example, in response to location parameter of "Hong Kong", a listing 306 shows those applications deployed in Hong Kong, including applications ABC and XYZ. The listing 306 may be formatted in any number of ways. Here, the listing 306 includes a tier 308, a name 310 of the technology, a unique application identifier (AID) 312, a division 314 and a location 316 in which the technology is deployed, and an owner 318 of the technology. Notice that each of the applications is in a location 316 of "Hong Kong".

With reference again to FIG. 1, the architecture shown in environment 100 facilitates this knowledge of where resources are located and who is responsible for them by collecting and maintaining an accurate, up-to-date inventory of applications and corresponding assets. Several tools are provided to ensure reliable collection of such information when the resources are deployed.

One tool to gather information on new applications is a series of interfaces served by the application directory 120 to automate and standardize registration of newly installed applications. For instance, suppose a new application is being installed in Hong Kong, and as part of the application, a software program 140 is installed on computer 130. As part of this installation process, a responsible user (e.g., IT personnel, business owner, computer user, etc.) is tasked with registering the new application. The application directory 120 serves a series of web pages designed to gather information from the user regarding the application name, location, division, business owner, and so forth. The information entered by the user is routed over the network and stored in the application directory 120. From there, the same information (or portions of it) can be fed to the GIW servers 112 for storage in the GIW database 142.

This process is repeated each time an application is installed, upgraded, removed, or replaced on any computing system throughout the organization. Also, similar processes may be employed for hard assets, such as computers, printers, network devices, and so forth. In this manner, the GIW 122 (and more particularly its database 142) maintains an accurate and current inventory of resources distributed throughout the organization. A more detailed discussion of collecting and maintaining this inventory is described below with reference to FIG. 4.

The ability to ascertain what resources are available where, at any given time, is beneficial for many reasons. One benefit is that knowledge of which technologies are deployed at what locations enables improved business continuity in the event of natural or human-instigated disaster. For instance, suppose a natural disaster hits Hong Kong (e.g., a tsunami, monsoon, earthquake, etc.), causing damage to a bond trading operation in Hong Kong (FIG. 1). A member of the BCP group sitting in New York would be able to quickly determine what assets have been adversely impacted and what functionality is missing. The BCP member may then reconstruct the lost resources in another location to bring the bond trading functionality back on line quickly.

Another benefit is that having an up-to-date inventory of technology assets allows for regular and timely upgrades. The architecture maintains an accurate accounting of all computers, their location, all software that is running on those computers, and the business owners that are being supported. When upgrades are scheduled to be deployed, a member of the organization's IT department can schedule the assets at various locations for software and hardware upgrades while providing sufficient time for the business owners to plan for service to be temporarily down, or to have additional resources available during the upgrade. Additionally, the IT department is able to manage asset lifecycles to timely replace certain computers and devices upon reaching an appropriate age.

An accurate inventory of computers and applications also facilitates space planning when people or departments are physically moved from one location to another. The moving team can be given a map of what resources are to be moved and re-installed at the new location. Furthermore, an accurate inventory allows the organization to more effectively monitor the security of its hardware and software assets. Such assets may also be tracked by appropriate business owners for such internal accounting as charge-backs, allocations, and provisioning and de-provisioning of assets.

Still another benefit of an accurate and up-to-date inventory is that the organization may adhere to certain deployment initiatives as well as comply with licensing agreements and support potential license negotiations.

Architecture

Figure 4:
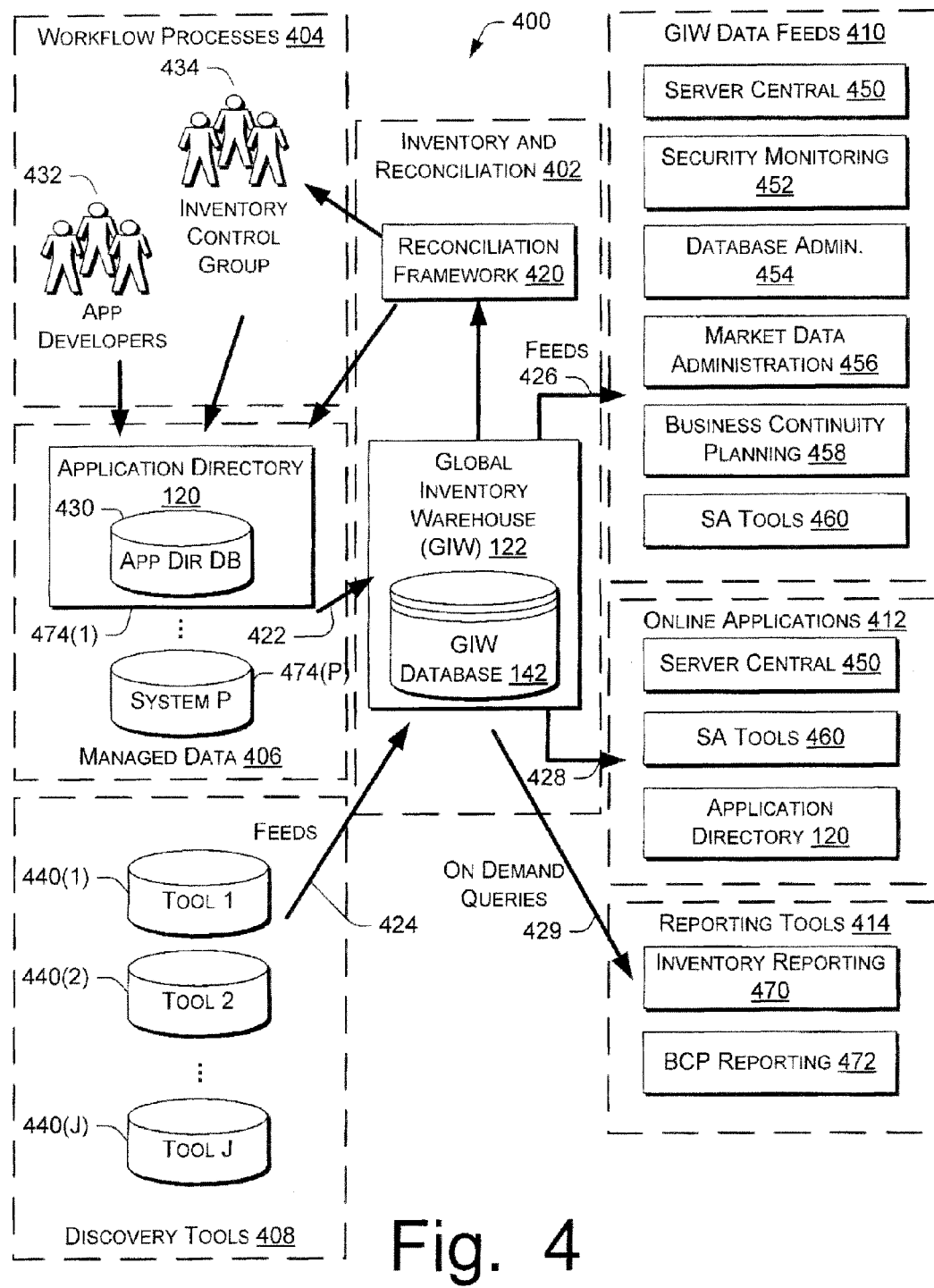
FIG. 4 illustrates one exemplary implementation of the architecture for building, maintaining, and managing an inventory of hardware, software, and telecommunications assets and data flow among various systems d processes in the architecture.

FIG. 4 shows an exemplary architecture 400 that may be implemented in the environment 100. The architecture 400 has several functional groups that together carry out the functions of inventory gathering, management, reconciliation, and reporting. The functional groups include workflow processes and automated computerized systems. In the illustrated implementation, there are seven groups: inventory and reconciliation systems 402, workflow processes 404, systems with managed data 406, discovery tools 408, systems receiving GIW data feeds 410, online applications 412, and reporting tools 414.

The inventory and reconciliation group 402 includes the global inventory warehouse (GIW) 122 and a reconciliation framework 420. The GIW 122 includes the GIW database 142 and is a repository of data collected from reconciliation and authoritative sources for purposes of building a consolidated inventory of hardware, software, and telecommunications assets. The GIW may also contain other information, such as exception information generated in response to one or more reconciliation processes.

The GIW 122 receives data feeds from the managed data systems 406 and the discovery tools 408 as represented by data flow arrows 422 and 424, respectively. The GIW 122 stores and organizes the data in various data structures and formats such that selections of the data may then be fed or produced on request to other systems, applications, and tools. As shown in FIG. 4, the GIW 122 provides data feeds to a collection of systems grouped under the GIW data feeds group 410, as represented by data flow arrow 426. The GIW 122 also provides replies to on-demand requests to a set of online applications 412 and to various reporting tools 414, as represented by data flow arrows 428 and 429, respectively.

Data is fed into the GIW 122 from the managed data systems 406. The managed data systems 406 include multiple data systems 474(1), . . . , 474(P), which capture data that is entered and managed by people according to workflow processes 404. The data in such systems does not lend itself to automatic discovery tools, such as tools 408 discussed below. Rather, the data might include information that managers enter, such as physical location, cabinet that the router sits in, and so forth. The data systems 474(1)-474(P) are representative of many possible data systems including, for example:

Active Directory™—a system that contains distribution lists and Windows™ Machine Mappings Cable Management Systems (CMS)—a system that contains locations (e.g., a cabinet location) of distributed assets Confucius—a system that contains strategy-based data from Linux™ Servers DeviceDB—a system that contains a managed inventory of Network Hardware Devices Configs—a system that contains database configuration information TAM—a system that contains technology assets and their locations Terminal Servers—a system that contains data about terminal servers DevForge—a system that contains information about application-development projects Device Modeling—a system that contains attributes (e.g., lifecycle) of hardware and operating system assets Domain Name System (DNS)—a system that contains domain name information for distributed assets Ivize™—a system that contains voicemail distribution lists LifeLine™—a system that contains contact lists Corporate Directory—a system that contains personnel data for employees of the organization Controller—a system that contains information (e.g., dept. codes, dept. open/close dates) about organizational departments SMART—a system that contains organization hierarchy SPARC™—a system that contains department redirects Technology Financial Services—a system that contains business unit mappings throughout an organization to facilitate reporting GSLocation—a system that facilitates data discovery on valid buildings, floors, rooms, and desk locations Another managed data system is the application directory 120 (also represented as data system 474(1) in FIG. 4). The application directory 120 serves in the architecture 400 as the authoritative inventory of applications deployed throughout the organization. The application directory 120 maintains the inventory in a repository or database 430. The database 430 organizes information relevant to the applications, such as criticality tier, unique identifier, business owner, division, location, and so on. As the authoritative system, the application directory database 430 is considered to be the most accurate and up-to-date collection of information on the applications. One exemplary implementation of the application directory 120 is described below in more detail with reference to FIG. 5.

Through individual data systems 474(1)-474(P), the managed data systems 406 provide a great deal of data to the GIW 122. For instance, the application directory 120 provides data on software applications to the GIW 122. Furthermore, the data in the managed data systems 406 is received from any number of sources. One source is, for example, application developers 432, who register applications with the directory 120 as part of various workflow procedures when the applications are installed or otherwise deployed. Another source is an inventory control group 434, which has management authority over the inventory maintained in the application directory database 430. The registration processes are streamlined for developers and managers to register applications with minimal manual intervention. Other data sources may exist for each individual data system 474(1)-474(P).

A third source for application-related information is the reconciliation framework 420, which updates the application directory through a validation and reconciliation process on the data maintained in the GIW 122. Reconciliation processes attempt to automate handling of data validation exceptions, and feeds the reconciled information to the managed data systems 406, such as the application directory 120. Data integrity is ensured and managed through these reconciliation processes which may in part populate the managed data systems 406 (e.g., application directory) data from the global inventory warehouse 122 feeds from the multiple discovery tools 408.

Table 1 shows an example, and non-exhaustive, list of possible data feeds into and out of the application directory 120, one of the managed data systems.

TABLE 1

| System | Data | Feed Direction |
|---|---|---|
| Business Continuity Planning | Application directory data to BCP system. | OUT |
| Authorization Monitoring Project | Authorized user data. If application user changes division or leaves organization, application managers are notified to change application access accordingly. | IN/OUT |
| Marimba | Window servers and installed software | IN |
| SysInfo | Unix servers and installed software | IN |
| Red Hat Network | Package information on Linux servers | IN |
| Switch Management | Server availability and location detection | IN |
| DBDB | Database if databases (Sybase, SqlServer, UDB) | IN |
| Sonar | Server availability and location detection (base system for all servers). | IN |
| TAM | Hardware Asset Inventory. Contains the location and asset tags for all desktops, servers, printer, routers and switches. | IN |
| Lifeline | Lists for support of jobs related to applications and servers. | IN |
| Corporate Directory | Contact information for deployment managers. Application Directory stores IDs (e.g., Kerberos, GUIDs, etc.) | IN |
| SMART/OrgBud | Divisional Hierarchy for Portfolio Reporting | IN |

Other feeds that may be passed into the application directory 120 include data from a system that monitors processes and servers (e.g., HP OpenView™ system) and data from risk reporting systems, Discovery tools 408 also provide data feeds to the GIW 122. The discovery tools 408 include multiple tools 440(1), 440(2), . . . , 440(J), which go out periodically or routinely (e.g., nightly) to gather data from the components themselves. The data is such that lends itself to automated collection without human intervention, and may involve such things as operating conditions, workload, failures, and so forth. The tools 440(1)-440(J) are representative of many possible automated data collection tools including, for example:

Confucius—a tool that provides strategy-based data from Linux™ Servers

EMC™ Enterprise Control Center—a tool that provides a raw storage area network inventory Marimba™—also known as Marimba Inventory—an agent used to deploy and report on packaged applications to Windows™ PCs.

Red Hat™ Network—an agent that runs on Linux™ and deploys packaged applications to Linux™-based servers.

SONAR™—an agent that provides IP address discovery

Switch Management System (SMS)—a tool that provides server availability, location detection (e.g., host connections and locations), and network information (e.g., information about network routers and switches)

Sysinfo—an agent that runs and reports on Unix configurations and variants

Storage Information on—a tool that provides inventory of storage area network (SAN) arrays, switches, and servers Production Access Reporting (PAR) tool that provides for production access reporting TRACER—a tool that manages and provides data reconciliation and grading services ProWatch™—a tool that provides data about data center access logs The GIW 122 provides data feeds to a variety of systems represented in group 410. Among these systems are Server Central 450, Security Monitoring 452, Database Administration 454, Market Data Administration 456, Business Continuity Planning 458, and System Administration (SA) Tools 460. The Server Central 450 is a web application that presents server inventory information from the system administrator perspective, including performance metrics information. The Security Monitoring system 452 is responsible for identification, engineering, and operation of solutions to monitor the security of the organization's infrastructure as well as the staff and vendors use of the systems. The Database Administration system 454 is responsible for management of various databases used throughout the organization. The Market Data Administration system 456 manages an inventory of internally and client-consumed market data. The Business Continuity Planning system 458 supports many continuity solutions including crisis management, business recovery, systems and data recovery, people recovery facilities, and process improvement. The SA tools 460 are a set of tools for monitoring operation of systems from a software and hardware perspective, such as performance metrics, usage, and the like.

Online applications 412 represent another set of data consumers from the GIW 122. The online applications include the Server Central 450, the SA tools 460 and the Application Directory 120. Each of these may be implemented as Web-based tools that can query the GIW 122 for specific information. Additionally, reporting tools 414 may submit queries to the GIW 122 to generate various reports on applications deployed throughout the organization. These reporting tools 414 might include, for example, Inventory Reporting 470 and Business Continuity Planning (BCP) reporting 472.

The illustrated data providers and data consumers of the information maintained in the global inventory warehouse 122 are representative. There may be any number and variety of data providers and data consumers. Moreover, the data providers and consumers may be off-the-shelf products or custom-built components designed specifically for the architecture or for particular functions. A section entitled "Global Inventory Warehouse" follows a discussion of the application directory 120 and an accompanying registration process, and describes components of the GIW 122 in detail.

Application Directory

Figure 5:
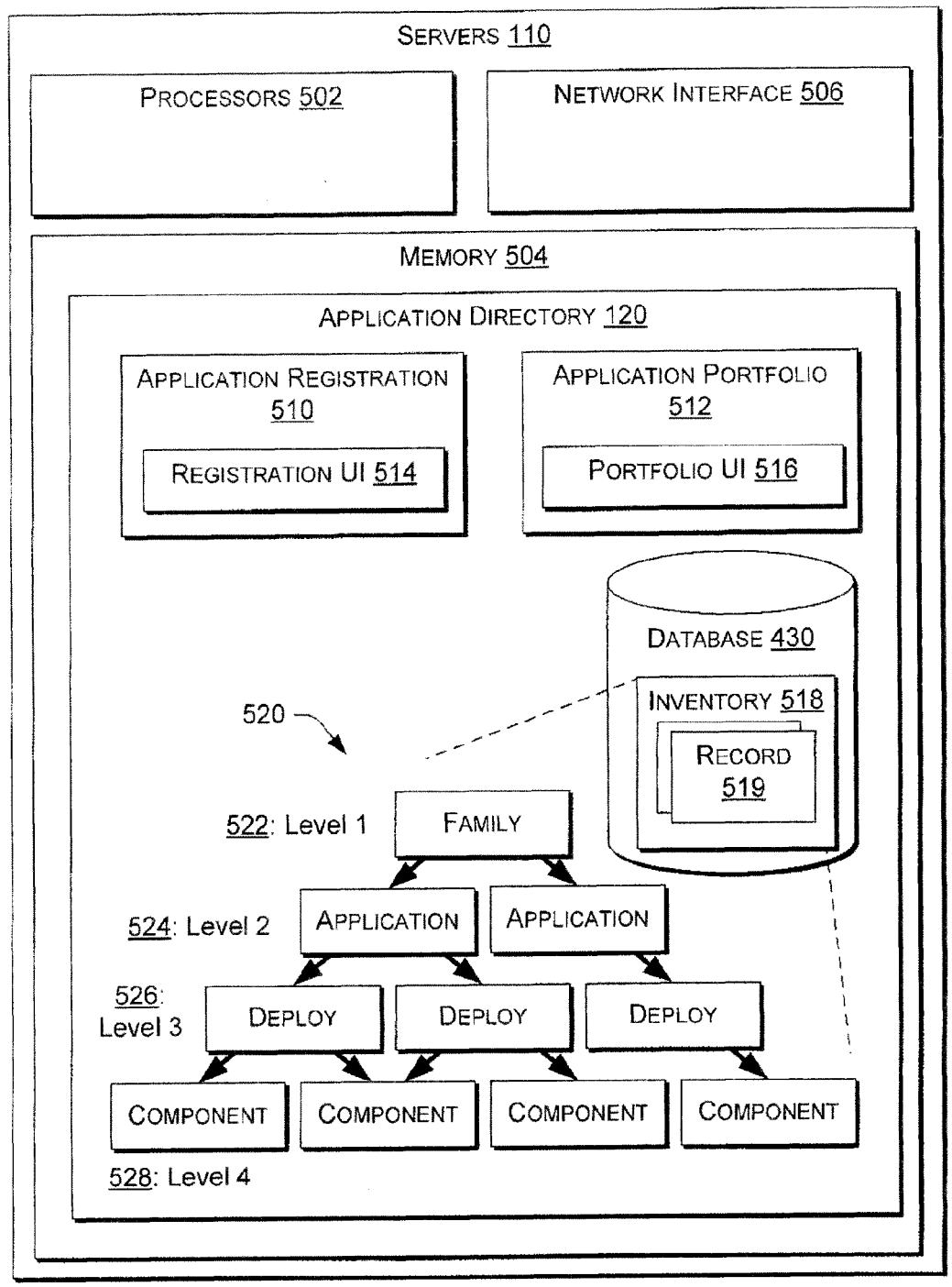
FIG. 5 is a functional block diagram of an application directory implemented on a computing system.

FIG. 5 shows one example implementation of an application directory 120 executing on one or more servers 110 (FIG. 1). The servers 110 are equipped with processing units 502 and memory 504 (e.g., volatile, non-volatile, and persistent memory). A network interface 506 provides access to and communication over a network (e.g., LAN, Internet, wireless, etc.).

The application directory 120 is shown stored in memory 504, but is executed on processing units 502 during runtime. Selected components in the application directory 120 include a repository or database 430, an application registration module 510, and an application portfolio module 512. As noted above, the application directory database 430 maintains an inventory of applications deployed throughout the organization. The application registration module 510 and the application portfolio module 512 provide Web-based tools for automated registration of applications and management of the application portfolio.

More particularly, the application registration module 510 facilitates automated registration of the applications and provides the mechanism for getting them approved for deployment. The module 510 includes a user interface (UI) 514 that guides developers and managers (and others) through the initial registration process, as well as any updates to application data in the application directory 120 and its associated checkpoints and reconciliation systems. Additionally, the application registration module 510 allows managers to approve new applications and deployments for submission to the business continuity planning (BCP) team. The BCP team can then review and approve deployment requests using the application registration module 510. An example set of UIs for the registration process is provided below in more detail with reference to FIGS. 6-11.

The application portfolio module 512 provides the online tool for managers to generate Web-based reports against the GIW data feeds of application directory data. The data feeds may be frequent (e.g., every day, every hour, etc.), or as updated, or as needed. With this module 512, a manager may generate reports that sort or format applications by various criteria, such as by division, location, tier, category, status, and an forth. The application portfolio module 512 has a portfolio 516 that provides interfaces for a user to enter search criteria and presents results of the search. Two exemplary UT interfaces are shown in FIGS. 2 and 3, as described above in detail. In FIG. 2, an application portfolio UI 200 facilitates user entry of various search criteria for applications distributed throughout the organization. The interface 300 shown in FIG. 3 presents a list of all applications that satisfy the search criteria. In addition, the portfolio UI 516 aids in the management of families of applications, and allows users to define groups within individual families.

There are several possible parties who may interact with the application directory 120. Developers (e.g., firm users, code developers, support engineers), development manager (e.g., mid-level development managers responsible for support and deployment of applications), members of the business continuity planning group, and regulatory auditors are among the different classes of users who may use the application directory 120.

The application directory 120 further includes a repository or database 430 to store the applications in an organized inventory 518. The inventory 518 is composed of records 519 that store data pertaining to the applications deployed throughout the organization. Each record 519 arranges data according to a hierarchical logical data model 520 that defines multiple levels of data types and relationships amongst those levels. The hierarchical data model 520 includes a top or family level 522, a second or application level 524, a third or deployment level 526, and a fourth or component level 528.

As noted earlier, an application is a logical entity, made up of components that perform a specific business function. A family defined at the first level 522 of the data hierarchy 520 is a collection of one or more applications in the second level 524 that either perform a set of related business functions or have a common IT support structure. Each application may have one or more deployments in the third level 526. A deployment is an instance of an application that runs in a specific location. And each deployment may involve one or more components in the fourth level 528. A component is a piece of an application that shows up as an individual system process or as an individual deployable unit. It is noted that this data hierarchy 520 exemplifies just one example arrangement of a data structure. Other hierarchical models of more or fewer levels may be employed.

Figure 6:
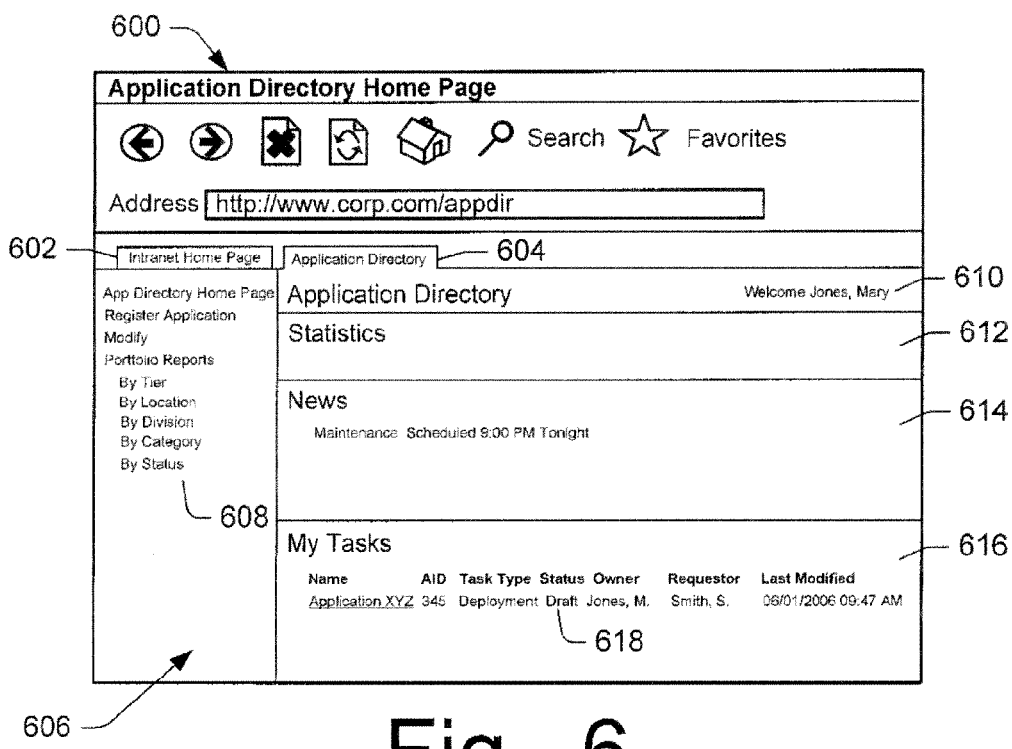
FIG. 6 is a rendering of an example home page for the application directory.

FIG. 6 shows an example home page 600 for the application directory 120. This home page 600 functions as an entry portal to the registration UI 514 and the portfolio UI 514. The home page 600 includes multiple tabbed panes including a tab 602 for access to the organization's intranet home page and a tab 604 for access to a primary pane 606 of the application directory. On this primary pane 606 are a navigation menu 608, a greeting 610 to the authorized user, a statistics area 612, a news area 614, and a task area 616.

The navigation menu 608 provides a set of links to various processes, such as registration, record modification, and reporting. To register an application, a user may access a sequence of web pages by selecting the link "Register Application" on the menu 608. Similarly, a user may generate a report of applications stored in the application directory database by choosing the "Portfolio Reports" link or one of the criteria links (e.g., "By Tier", "By Location", etc.) in menu 608.

The statistics area 612 provides a summary of the total applications, deployments and components registered. The news area 614 provides notice of any system alerts, such as enhancements, bug fixes, updates, maintenance down time, and so forth. The task area 616 provides a running list of applications to be acted upon by the user, based on that user's role. The list includes active links to an application management page that allows the user to act on the application. The link is represented by underlining in FIG. 6, although other expressions may be used such as font change, color differentiation, and so on.

The task list in area 616 further includes a status designation 618 of each open task. Table 2 provides a listing of possible statuses:

TABLE 2

| Status | Definition | Next Status |
|---|---|---|
| DRAFT | Developer is drafting a new or revision of application/deployment and has not yet submitted it to a developer manager for approval. | OPEN |
| OPEN | Developer manager is reviewing new or revision of application/deployment and has not yet submitted to BCP for approval. | PENDING or REJECTED |
| PENDING | Developer manager has submitted application for BCP approval. | ACTIVE or REJECTED |
| REJECTED | BCP or development manager has rejected application data, status is reverted to "DRAFT" for developer to review and update data for application and resubmit for developer manager and BCP approval. | DRAFT |
| ACTIVE | BCP has reviewed application data and approved application for deployment. | NA |
| EXCEPTION | Reconciliation with GIW feeds has shown discrepancies and applications are flagged as "EXCEPTION". Application data is flagged as out of date if application has not been reviewed by development team in a specified amount of time. | If data is reviewed, corrected and discrepancies are cleared, will go to DRAFT state. |
| DE-COMMISSION | Legacy server or application no longer in use. | N/A |
| REPLACED | Legacy application has been replaced by new application. Reference new application identifier for replacement application. | N/A |
| INACTIVE | Legacy status - Used on inactive applications for historical purposes | NA |

Now, suppose a user would like to register a new application. The user may actuate the "Register Application" link in the menu 608. That would lead him to a series of screens to enter data about the application.

Figure 7:
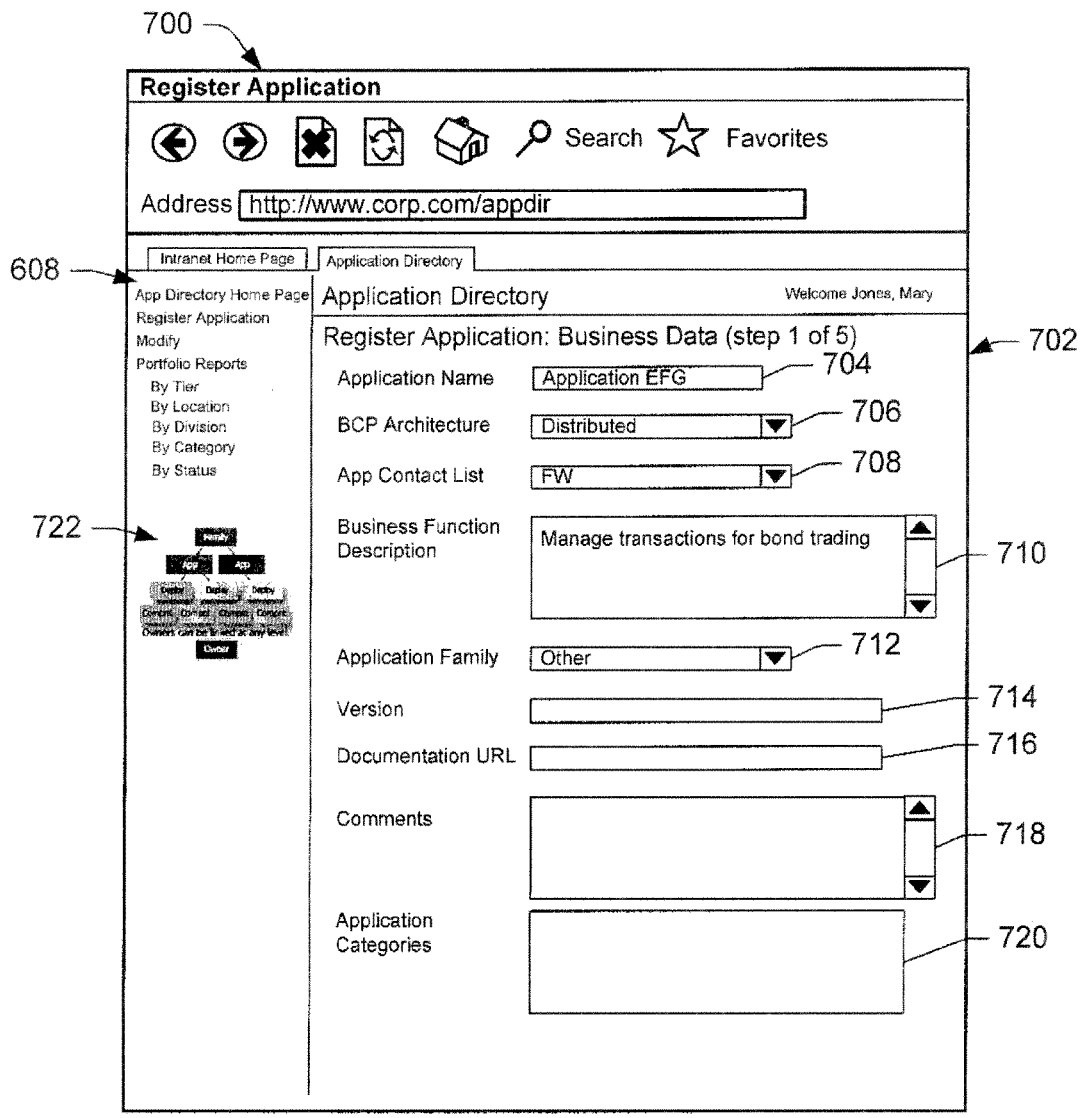

FIG. 7 shows a first registration page 700 that is initially served by the application directory 120 when a user seeks to register a new application. The registration page 700 includes a pane 702 that systematically guides the user through a series of questions about the application. The registrant enters a name for the application in entry field 704. The name may conform to standardized naming conventions, and its size may be constrained to some maximum number of characters. A BCP architecture pull down menu 706 allows the user to select a general architecture of the application, including such choices as mainframe, distributed, and mid-range.

A contact list for the application may be selected by pull down menu 708. This contact list identifies which business organizations (divisions) are primary clients of this application. In response to selection, a table of responsible owners will be automatically populated with appropriate names. A brief description of the primary business function performed by the application may be entered into field 710. Such a description may be limited to a number of words (e.g. 500 words).

The registrant selects an appropriate application family for this application using pull down menu 712. A set of predefined family names are provided in this menu, enabling the registrant to quickly find which family is the best fit for the application. A version number for the application may be entered into field 714, and a document URL (universal resource locator) may be added in field 716. Any additional comments may be entered into text field 718.

Some applications may be governed by various government (federal, state, and city) regulations. For instance, applications related to financial transactions may be governed by SEC rules, federal laws, state regulations, and so forth. In field 720, the registrant may be presented with a list of possible regulation categories that might be applied to the application. The registrant can select suitable categories and the application is marked for compliance with the selected categories.

Notice also in the left margin beneath the menu 608 is a small icon 722 that provides a visual cue of the hierarchical logical data model 520. The model conveys to the registrant how data is being organized within the logical data model. A focus is also provided to illustrate which data is currently being sought from the registrant as he proceeds through the series of web pages. In this illustration, the upper two levels—family level 1 and application level 2—are in focus to visually convey that this portion of the registration concerns higher level information pertaining to the application and its family. The focus may be accomplished by changing the color of the upper two levels, or by highlighting them, or by enlarging them, or through some other graphical technique. As the registration process continues, different levels of the icon 722 will be placed in focus to assist the registrant.

FIG. 8 shows a second registration page 800 that continues the registration process. Notice that the focus in the hierarchy icon 722 has now shifted to the deployment level 3 to visually inform the registrant that this web page concerns entry of deployment information. Additional focus is on an "owner" box at the bottom of icon 722 to impart that this page 800 contains entry fields for identifying the owner of the application.

A pane 802 guides the user through a series of questions to extract deployment details. In field 804, the user enters a location (e.g., "New York") at which the application will be deployed. This location may be of any configurable granularity appropriate for the implementation, and may include floor, building, city, region, state, country, and so forth. A deployment name may be entered in field 806, and a unique application identifier (AID) 808 is automatically generated when a deployment is registered.

A tier is assigned at pull down menu 810. The tier provides a criticality rating of the deployment and ranges, for example, from of low criticality to a 4 of high criticality. A next schedule test date may be entered into field 812 (or selected using a calendaring tool). These dates may include failover testing, live user testing, and the like. More than one type of test may also be scheduled by adding additional options in pane 802. The deployment manager responsible for the deployment from a technical and BCP perspective is selected in field 814. The individual chosen may be given responsibility to approve the deployment before it goes to the BCP group. One or more ROTAs may be added or removed using field 816. A collection of ROTAs (short for rotary) forms a list of contacts and preferred order and method (cell/page/call) of notifying those contacts in case an application problem occurs. It is used as reference data in the application directory, an alternate way of specifying the application deployment's contacts. Finally, a registrant may click an "Add Server" button 818 to choose servers utilized by this deployment. This action will open a new window to facilitate searching and addition of servers. The selected servers are then listed in table 820, which includes such information as a server asset tag, hostname, location, make/model, and platform.

Figure 9:
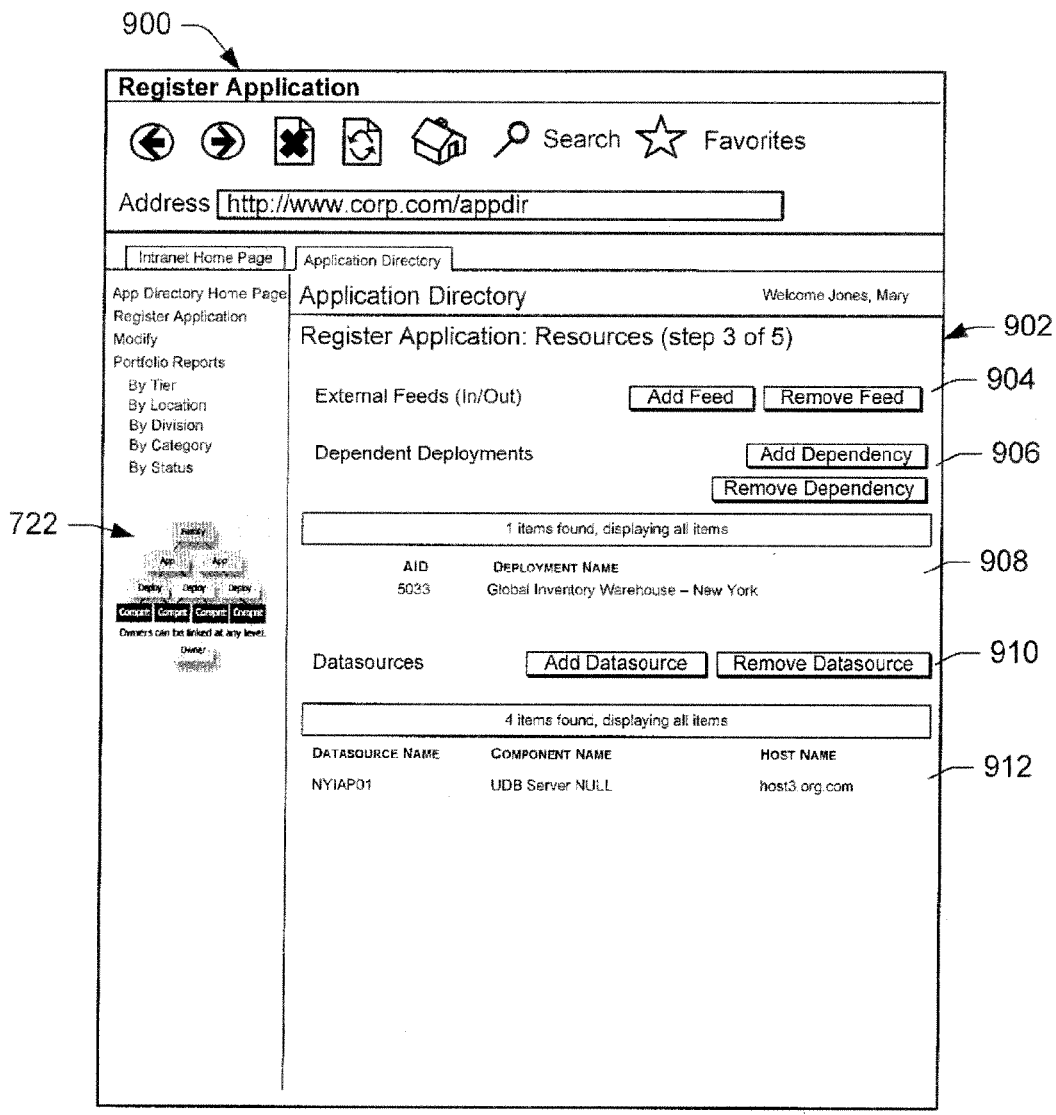

FIG. 9 shows a third registration page 900 that directs a registrant through the third step of the registration process. On this page 900, the focus of hierarchy icon 722 has shifted down to the component level 4 to visually convey that this page pertains to input of component information. A pane 902 guides the user through a series of entries regarding component information. In pane 902, the registrant may identify external data feeds in entry area 904 by clicking an "Add Feed" button to choose external feeds utilized by the application. This action will open a window that allows the user to search and add feeds. These feeds will then be depicted in a table (not shown). The user may subsequently remove feeds by actuating the "Remove Feed" button.

In entry area 906, the registrant may add any other deployments and internal feeds upon which the application is dependent. By clicking an "Add Dependency" button, a window is presented to facilitate search of dependent deployments. These deployments are listed in a dependent deployments information table 908. Any dependent deployment may be removed from the table 908 through use of the "Remove Dependency" button.

Data sources are also identified in entry area 910. Data sources include database instances and the components that run them. Actuating an "Add Datasource" button causes a window to open for searching and adding data sources to a data source information table 912. If a data source is on a server not currently associated with the deployment, selecting the data source effectively adds the server to the deployment. A "Remove Datasource" button is also provided to remove items from the table 912.

Figure 10:
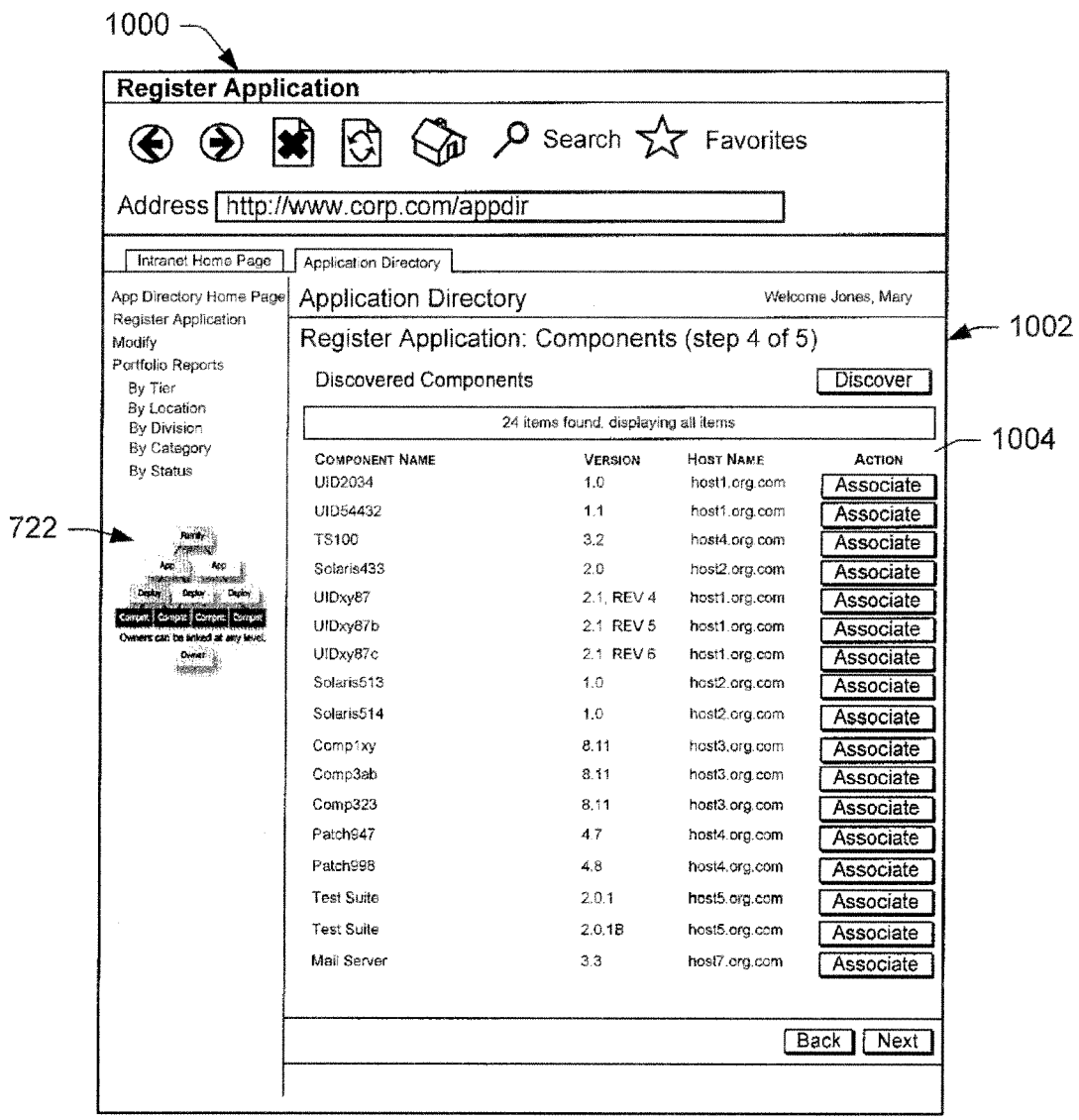

FIG. 10 shows a fourth registration page 1000 that continues entry of component detail in level 4, as noted by the visual hierarchy icon 722. A pane 1002 assists the user in discovering components relevant to the application being registered. When a user initiates the discovery process (e.g., by clicking the "Discover" button), a search query is sent to the global inventory warehouse (GIW) to return all components associated with the current deployment. These components include servers and other devices that implement the application. Components found by the search are returned and listed in a discovered components table 1004. The registrant may associate the component with the deployment by clicking an "Associate" button provided for each listed component.

FIG. 11 shows a fifth and final registration page 1100 that facilitates entry of BCP audit date in the fifth and final step in the registration process. The BCP audit date pertains to the deployment level of detail and hence, the deployment level 3 is in focus once again on the visual hierarchy icon 722. A pane 1102 guides the registrant through details of an audit for purposes of business continuity planning.

At fields 1104-1108, the user can enter dates for when the technology was tested, when user testing was completed, and when connectivity testing was conducted. Any comments relating to the BCP audit may also be provided in text entry field 1110, including such comments on the rational behind a criticality rating assigned to the application. Also via this pane 1102, the deployment of this application may be approved (by clicking the "Approve" button 1112) or rejected (by clicking the "Reject" button 1114). If approved, the application status is changed to "Active" (See Table 2 above). Conversely, if rejected, the application status is returned to "Draft" status, and the developer at this point should review the application and registration, updating all data for application deployment, and then resubmit for approval.

Registration Processes

Figure 12:
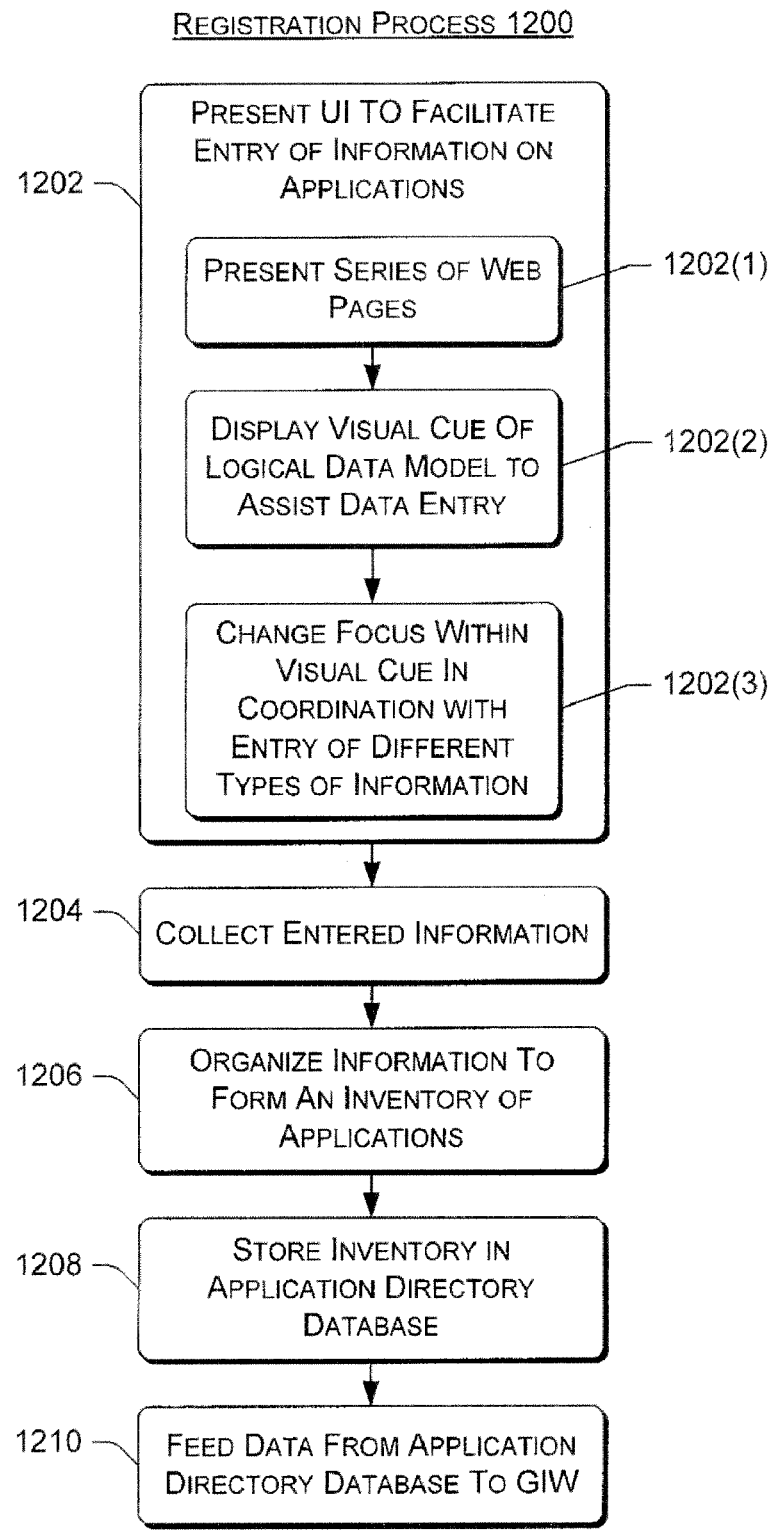
FIG. 12 is a flow diagram of an exemplary process for registering an application with the application directory.

FIG. 12 illustrates a computerized process for registering applications or other assets of the organization. This process (as well as other processes discussed herein) is illustrated as a collection of blocks in a logical flow graph, which represents a sequence of operations that can be implemented, in whole or in part, in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The sequence in which the operations are described is not intended to be construed as a limitation, and any number of the described blocks can be combined and/or rearranged in other sequences to implement the process.

For discussion purposes, the process 1200 is described with reference to the architecture, systems, and UIs of FIGS. 1-11. It is noted, however, that the processes may be implemented in many other ways.

FIG. 12 shows a computerized registration process 1200. At 1202, a user interface is presented to facilitate entry of information pertaining to an application. In one implementation, this user interface is embodied as a Web-based data entry tool that may be rendered in a browser. Accordingly, in this implementation, the first act 1202 of facilitating entry of information may consist of three actions 1202(1)-1202(3). At 1202(1), the tool presents a series of web pages that guide the user through the registration process, collecting information about the application. One example series of web pages are described above and shown in FIGS. 6-11. These web pages are served by the application directory 120 and rendered by a browser or other rendering program.

The web pages seek entry of different types of information about the applications. The different types of information conform to the logical data model 520, which defines multiple hierarchical levels of data types and relationships amongst the hierarchical levels. At 1202(2), a visual cue representing the logical data model is depicted on the web pages to convey what data is currently being entered, and how that data is being organized in the inventory. One example visual icon is illustrated in FIGS. 7-11 as icon 722. Individual levels of the visual cue are placed in focus during the registration to aid the user during entry of the different data types to convey which data is being entered and how it is being organized within the logical data model. At 1202(3), the focus is changed within the visual cue of the logical data model in coordination with the data being collected by the web pages. As illustrated in the example of FIGS. 7-11, the focus is changed throughout the sequence of web pages.

At 1204, information pertaining to the various data types is collected during the registration process. Among the information collected are an application name, a family to which the application belongs, deployment data pertaining deployment of the application, component data identifying components used by the application, and owner data identifying a business owner responsible for the application. Additionally, as exemplified in FIGS. 7-11, other information pertaining to the application may also be collected.

At 1206, the information is organized to form an inventory of applications. This inventory is maintained in the application directory database 430 (at 1208 in FIG. 12), and at least portions of the inventory are fed to the global inventory warehouse 122 (at 1210 in FIG. 12). In this manner, the application inventory may be viewed as being stored in two different databases—the application directory database 430 and the GIW database 142 (FIG. 1). The following section describes in detail the GIW 122 and its accompanying database 142.

Global Inventory Warehouse

FIG. 13 illustrates one example implementation of a global inventory warehouse (GIW) 122 executing on one or more servers 112 (FIG. 1). Similar to the servers 110 described above with reference to the application directory 120, the servers 112 are equipped with processing units 1302 and memory 1304 (e.g., volatile, non-volatile, and persistent memory). In addition, a network interface 1306 provides access to and communication over a network (e.g., LAN, Internet, wireless network, etc.), which allows authorized personnel to search the GIW database 142.

As discussed above, the GIW 122 is a repository of data collected from reconciliation and authoritative sources for purposes of building a consolidated inventory of hardware, software, and telecommunications assets. This data may include some or all of the information discussed above in regards to the application directory, such as an identification of the assets and the assets' physical locations. The GIW 122 may also contain exception information generated in response to one or more reconciliation processes. Furthermore, the GIW 122 maintains a history of the received data. The GIW 122 also supports reporting of the information in many different views and formats.

In addition to storing identifications of assets, physical locations of assets, and exception information, the GIW may also build relationships between assets in response to receiving data from the application directory 120. As discussed above, a user may register an application with the application directory and, in the process, register that application with a particular server upon which the application resides. When the application directory feeds this data to the GIW 122, the GIW then creates other relationships based on that data and based on additional information stored in the GIW. For instance, the GIW 122 may know that the particular server upon which the particular application resides is part of a particular network. The GIW 122 accordingly builds a relationship between the application, the server, and the particular network. Similarly, the GIW may create relationships between the application/server combination and a market data network, an Ethernet network, physical location information, tape backup location information, and the like. Furthermore, after creating these relationships, the GIW may provide these relationships back to the application directory 120. In turn, the application directory populates fields within the application directory user interface in order to allow for an application directory user to view these relationships.

FIG. 13 illustrates that the GIW 122 is stored in the memory 1304 of the one or more servers 112. Exemplary components in the GIW 122 include the GIW database 142, a receiver 1308, and a converter 1310. Selected components in the GIW database 142 include one or more source tables 1312, one or more staging tables 1314, and a refresher 1316.

The receiver 1308 receives data from some or all of the sources illustrated in FIG. 4, such as the managed data systems 406 and the discovery tools 408. The GIW 122 stores and organizes this received data in various data structures and formats. This storage and organization allows portions of the data to be fed or produced on request to other systems, applications, and tools. To so store, organize, and provide this data, the receiver 1308 initially receives a batch of raw data from the data sources. The receiver 1308 stores this batch as raw data records 1318.

The converter 1310 receives the raw data records 1318 and converts this raw data into "source" (src) data. FIG. 13 illustrates this converted data as src data records 1320. During the conversion, the converter 1310 computes a hash (e.g., MD5) of the raw data records 1318. This hash value creates an artificial primary key for each data record, which serves to uniquely identify each data record. By doing so, the converter 1310 allows the data to be annotated and indexed by its originating data source. This data conversion, also includes converting source-system timestamps of the data into GIW-formatted timestamps.

After this conversion, the GIW database 142 receives the src data records 1320. Briefly, the one or more source tables 1312 are purged of any old data from a prior load, receive the new src data records, and then provide them to the one or more staging tables 1314. Authorized personnel can then search the staging tables and generate reports based on the information contained therein.

More specifically, the one or more source tables 1312 receive the src data records 1320 and build an inventory 1322 that contains this received batch of data records. FIG. 13 differentiates the data records within the source table inventory 1322 by representing them as SRC data records 1324. The inventory 1322 within the source tables 1312 generally provides the received batch of data records to the one or more staging tables 1314.

The staging tables 1314 thus receive the SRC data records 1324 and create an inventory 1326 that includes these records. At this point, the data records are designated as staging (STG) data records 1328. The staging table inventory 1326 operates to allow authorized personnel to search and generate desired reports from the data records therein.

By receiving batches of data records and providing each batch to the staging tables 1314, the source tables 1312 serve as a buffer between the source data systems and the staging tables 1314. This demarcation between tables thus helps to avoid introduction of invalid data from the source systems into the staging tables 1314. In turn, this demarcation helps to avoid introduction of invalid data into reports actually generated by the authorized personnel.

As stated above, the source tables 1312 generally receive batches of data records and provide these data records to the staging tables. Upon receiving a new batch of data records, the source tables 1312 generally delete the previous batch in order to make room for the new batch. Maintaining a batch of data records in the source tables until a new batch arrives allows administrators to perform debugging in the source tables if the administrators encounter problems with the data. The inventory 1326 within the staging tables, meanwhile, not only contains up-to-date and correct information, but also a history of that information. As such, the staging-table inventory 1326 generally does not delete data records, but rather tracks changes to the data as the changes occur.

To illustrate, the staging tables 1314 first receive the SRC data records 1324 from the source tables 1312 and, with the data, generate and maintain the inventory 1326. Again, this inventory 1326 includes STG data records 1328. As mentioned above, however, information pertaining to source systems will generally change with time. For instance, a location of a hardware asset may change. The inventory 1326 of STG data records should accordingly be updated to reflect these changes, while still maintaining a history of previous locations of the hardware asset. The refresher 1316 in conjunction with the SRC and STG data records updates the inventory 1326 in this manner.

The refresher 1316 may be configured to refresh STG data records 1328 when a change to a corresponding SRC data record 1324 occurs or, conversely, after a predefined amount of time. In the latter instances, the refresher 1316 initially compares the STG data records to corresponding SRC data records and counts a percentage of the former that should be refreshed. If this percentage is greater than a pre-configured threshold value, then the refresher 1316 aborts the refreshing process. If this percentage is less, however, then the refresher proceeds with the refreshing process.

The refresher 1316 first closes any open STG data records that don't correspond to an SRC data record in the source table inventory 1322. The refresher then refreshes the remaining STG data records with data from corresponding SRC data records. In some instances, the refresher matches corresponding records based on each record's hash value computed by the converter. The refresher may also match corresponding records by merely comparing the record values, After matching corresponding SRC and STG data records, the refresher 1316 may utilize a technique known as "milestoning". This technique begins by tagging each data record with a "start date" and an "end date". The start date generally corresponds to when the data record was inserted into the inventory, while the end date generally corresponds to the time at which the data record should no longer be considered "live", "current", or "up-to-date". If a record's end date has passed, then the refresher may know to update the data record. Of course, this milestoning technique is exemplary and other techniques may be utilized. For instance, in a "snapshot" technique, the refresher merely compares a previous snapshot of the staging table inventory 1326 to a current snapshot, and updates the inventory 1326 based on the difference.

In addition to updating existing records, the refresher 1316 creates a new STG data record for any SRC data record created since the last refreshing process. The refresher 1316 also inserts these new data records into the staging table inventory 1326. This refreshing process thus ensures that the staging table inventory 1326 contains the most up-to-date information. Importantly, the STG data records and the staging table inventory 1326 also maintain the information present in the inventory 1326 before the above-described refreshing process.

The inventory 1326 within the staging tables 1314 thus represents all or substantially all of the data received from the source systems. This consolidated inventory maintains a history of this data, even as it changes with time. For instance, any change to a location of a hardware, software, or telecommunications asset will be noted. Both locations, however, will be stored within the inventory 1326, thus facilitating the reporting of this history should authorized personnel desire such information.

As such, the resulting GIW database 142 allows for customized viewing of data corresponding to multiple source systems. Furthermore, this viewing may be customized at any level of granularity, including customizing authorized personnel's viewing of individual data fields within a single data record. Such a database allows these personnel to find data discrepancies within source systems by cross-referencing each system. The GIW database 142 also enables searching and reporting of historical data. Finally, note that the detailed information within STG data records 1328 enables the reporting of substantially all reasonably useful information pertaining to the source systems. This information not only includes physical locations of distributed assets, but also exception information created during one or more reconciliation processes.

FIG. 14 illustrates an exemplary process 1400 for receiving a data record from a source system and storing the record in the GIW database 142. Source system "Alpha" 1402, containing an exemplary batch of data records labeled "Set", represents the exemplary source system. Data flow arrow 1404 represents the receiver 1308 first receiving the "Set" data records as raw data labeled "File Set-raw.txt". The converter 1310 then receives and converts this batch of data records into src data labeled "File Set-src.txt", as data flow arrow 1406 represents. Data flow arrow 1408 illustrates the converter 1310 then providing this data to the source table 1312 of the GIW database 142.

After receiving the hatch of data records, the source table stores and entitles this batch as "T_SRC_Alpha_Set", Any prior data in "T_SRC_Alpha_Set" is initially purged before storing this new batch of records. The first portion of the title (T_SRC) identifies the records as being stored within the source table 1312. The middle (Alpha) and latter (Set) portions, meanwhile, identify the batch of data records with its corresponding system and its initial hatch name. The source table 1312 or the refresher 1316 then provides these data records to the staging table 1314, which stores the batch of data records as "T_STG_Alpha_Set". Data flow arrow 1410 represents this operation. Again, the former portion of the "T_STG_Alpha_Set" label identifies this batch of data records as being stored within the staging table 1314.

In accordance with this exemplary process 1400, the staging table inventory 1326 contains data records corresponding to the "Set" batch of files from the "Alpha" source system. Each batch of data records from each source system within an organization may likewise be included in this inventory, via process 1400 or the like. As such, the staging table inventory 1326 may contain an identification of all or substantially all of the organization's hardware, software, and telecommunications assets, as well an identification of physical locations of these assets. Again, this inventory may also include other information, such as exception information generated during one or more reconciliation processes.

Inventory Management Processes

Figure 15:
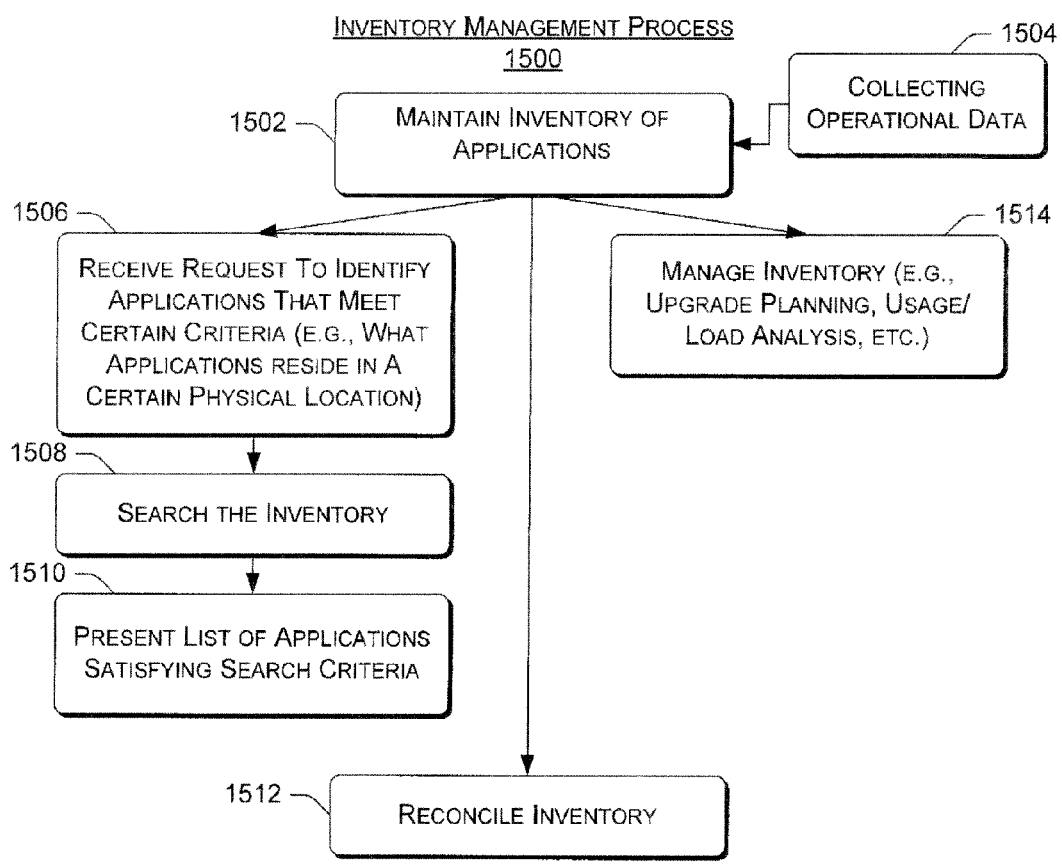
FIG. 15 is a flow diagram of an exemplary process for managing the hardware, software, and telecommunications assets in the architecture of FIG. 4.

FIG. 15 shows a process 1500 for managing and utilizing the application directory 120 and the GIW 122. The process 1500 is described with reference to the architecture, systems, and UIs of FIGS. 1-14 but may be implemented in many other ways. At 1502, an inventory of applications and other assets distributed throughout an organization is maintained. In part due to the registration process, the inventory is kept up-to-date and accurately reflects the current deployment of applications in the organization. Moreover, at 1504, operational data is collected from deployed applications on an ongoing basis. Such information may be supplied by software and hardware components, and may include such data as usage, load, failure conditions, aging, and so forth. In this manner, the inventory provides a robust and current knowledge source of all applications within the organization.

The inventory may be used effectively in many different ways. Three different scenarios are shown in FIG. 15, but these scenarios are merely illustrative and are not intended to be limiting. In one scenario, authorized personnel (e.g., IT department, BCP members, developers, etc.) may mine the inventory to learn what applications and other assets are deployed in the organization. Such personnel may employ a UI to define a search of the inventory for certain assets that meet the search criteria. One example UI is illustrated in FIG. 2, where the user permitted to search applications by tier (i.e., criticality), location, division, category, and owner. Many other search criteria may be employed.

At 1506, the search request is received and processed. Suppose, for example, the search personnel wants to know what assets are deployed on the $36^{th}$ floor of a building in Hong Kong, as represented in the environment 100 of FIG. 1. A search request may be defined with such granularity to find all such assets that are deployed at this physical location in Hong Kong. At 1508, the inventory is searched responsive to this request. The searching may be conducted on the application directory database 430, or alternatively on the GIW database 142.

At 1510, a listing of assets from the inventory that satisfy the search is presented. This listing may be presented in a UT, such as the one example shown in FIG. 3. Being able to call up all applications and other assets that meet a certain criteria is very useful in many ways. For instance, following a disruption at a particular location, the BCP team may wish identify all assets deployed in the particular location and rebuild the functionality elsewhere. As another example, space planners may need to move a department from one physical location to a new physical location. By mining the inventory to identify the assets affected by the move, the space planners can take steps to ensure the functionality is available elsewhere during this transition and minimize the time that the assets are down.

In another scenario shown in FIG. 15, authorized personnel using the reconciliation framework can reconcile records in the inventory with data from other sources in the architecture to ensure accuracy and data integrity in the inventory. Thus, at 1512, a reconciliation process may be performed on the inventory.

In still anther scenario shown in FIG. 15, different personnel may use the inventory to manage the applications and other assets at 1514. For instance, suppose the IT department wants to upgrade all applications in a systematic way. An IT team member may conduct a search for applications based on age or lifecycle criteria to identify which applications are suitable for upgrade or replacement. As another example, suppose the IT department wishes to evaluate the applications for usage and load. By maintaining an accurate and up-to-date inventory of applications, including usage and load, actions may be taken to anticipate and prevent potential problems such as application failure.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A global inventory processor-implemented method, comprising:
   obtaining, via a processor, source data records identifying distributed assets;
   accessing a searchable staging table comprising a plurality of staging data records;
   generating hash values related to the source data records;
   associating the hash values to corresponding source data records;
   comparing the staging data records in the staging table with the obtained source data records using the hash values;
   determining a percentage of the staging data records that need to be updated based on the comparison of the staging data records with the source data records;
   comparing the percentage with an update threshold value; and
   updating the staging data records based on the comparison of the percentage with the update threshold value.

2. The method of claim 1, further comprising:
   receiving a query related to an asset;
   searching the staging table in response to the query; and
   providing information in response to the query based on searching the staging table.

3. The method of claim 1, further comprising:
   associating start and end dates with the source and staging data records for use in update percentage determination.

4. The method of claim 1, wherein the staging data records are updated if the percentage is less than the update threshold value.

5. The method of claim 1, wherein the distributed assets comprise hardware, software and telecommunications assets.

6. The method of claim 5, wherein the source data records identifying software assets include information related to where the software assets reside.

7. The method of claim 1, wherein the staging table further comprises exception information related to prior updates of the staging table.

8. The method of claim 1, wherein the source data records are automatically obtained periodically.

9. A global inventory system, comprising:
   a processor; and
   a memory disposed in communication with the processor and storing processor-executable instructions, wherein the instructions comprise instructions to:
     obtain source data records identifying distributed assets;
     access a searchable staging table comprising a plurality of staging data records;
     generate hash values related to the source data records;
     associate the hash values to corresponding source data records; and
     compare the staging data records in the staging table with the obtained source data records using the hash values;
     determine a percentage of the staging data records that need to be updated based on the comparison of the staging data records with the source data records;
     compare the percentage with an update threshold value; and
     update the staging data records based on the comparison of the percentage with the update threshold value.

10. The system of claim 9, wherein the instructions further comprise instructions to:
    receive a query related to an asset;
    search the staging table in response to the query; and
    provide information in response to the query based on searching the staging table.

11. The system of claim 9, wherein the instructions further comprise instructions to:
    associate start and end dates with the source and staging data records for use in update percentage determination.

12. The system of claim 9, wherein the instructions further comprise instructions to:
    update the staging data records if the percentage is less than the update threshold value.

13. The system of claim 9, wherein the instructions further comprise instructions to:
    automatically obtain the source data records periodically.

14. The system of claim 9, wherein the distributed assets comprise hardware, software and telecommunications assets.

15. The system of claim 12, wherein the source data records identifying software assets include information related to where the software assets reside.

16. The system of claim 9, wherein the staging table further comprises exception information related to prior updates of the staging table.

17. An asset relationship determination processor-implemented method, comprising:
    obtaining source data records related to distributed assets;
    accessing a searchable staging table comprising a plurality of staging data records;
    comparing the staging data records with the source data records;
    determining a percentage of the staging data records that need to be updated based on the comparison of the staging data records with the source data records;
    comparing the percentage with an update threshold value;
    updating the staging data records based on comparing the staging data records with the source data records when the percentage is less than the update threshold value; and
    building via a processor relationships between the assets based on extracting features of the assets from the updated staging data records.

18. The method of claim 17, further comprising:
    comparing the features of the assets with each other;
    identifying relationships between the assets based on comparing the features of the assets with each other; and
    storing information for the updated staging records related to the common features in the staging table.

19. The method of claim 17, further comprising:
    receiving a query related to an asset;
    searching the staging table in response to the query; and
    providing information related to relationships of the asset in response to the query based on searching the staging table.

20. The method of claim 17, wherein the distributed assets comprise hardware, software and telecommunications assets.

21. The method of claim 20, wherein the source data records include information related to communication networks with which the assets are disposed in communication.

22. The method of claim 17, wherein the source data records include information related to physical locations of the assets.

23. An inventory evolution tracking processor-implemented method, comprising:
    obtaining source data records related to distributed assets;
    generating timestamps associated with the source data records;
    accessing a searchable staging table comprising a plurality of staging data records;

associating start and end dates with the source and staging data records for use in update percentage determination;

determining a percentage of the staging data records that need to be updated based on a comparison of the staging data records with the source data records;

comparing the percentage with an update threshold value;

generating updated staging data records when the percentage is less than the update threshold value; and tracking inventory evolution via a processor based on the comparison of the staging data records with the source data records.

24. The method of claim 23, further comprising:

identifying staging data records that need to be updated based on comparing the staging data records with the source data records;

generating updated staging data records with data from the source data records based on comparing the staging data records with the source data records; and storing the updated staging data records as supplemental information related to the staging data records.

25. The method of claim 23, further comprising:

receiving a query related to an asset;

searching the staging table in response to the query; and providing information related to evolution of the asset in response to the query based on searching the staging table.

26. The method of claim 23, wherein the distributed assets comprise hardware, software and telecommunications assets.

27. The method of claim 23, wherein the source data records include information related to physical locations of the assets.

* * * * *